United States Patent Office 3,830,913
Patented Aug. 20, 1974

3,830,913
ANTIFUNGAL AND ANTIBACTERIAL
GRAPEFRUIT DERIVATIVE
Jakob Harich, Orlando, Fla., assignor to
Rush-Hampton, Inc., Orlando, Fla.
No Drawing. Filed Apr. 29, 1971, Ser. No. 138,819
Int. Cl. A01n 9/08
U.S. Cl. 424—195                    12 Claims

ABSTRACT OF THE DISCLOSURE

A composition effective as a biocidal agent is prepared by adding 2-phenoxy-ethanol to a grapefruit derivative prepared by reacting the pulps of fresh grapefruit with an organic alcohol or ketone in the presence of a free radical initiator and then successively adding n-alkyl substituted dimethyl benzyl ammonium chloride, isopropyl alcohol, and 1-(3-chloroallyl) - 3,5,7 - triaza - 1 - azoniaadamantane chloride. The final composition is effective against a broad spectrum of gram positive and gram negative microorganisms.

---

This invention relates to novel organic compositions and their method of preparation, and more particularly to novel organic compositions which can be used as effective antimicrobial and antifungal agents.

Fungicidal and bactericidal compositions employed generally present one or more problems in production or use. Thus, for example, fungicidal and fungistatic chlorinated phenyls are normally highly toxic, necessitating special handling. Also, many copper-containing fungicides result in high treatment costs, are effective over an abbreviated period of time, and involve difficulty in formulation because of poor solubility characteristics. Phenylmercurials are also employed as biocidal agents but are uneconomical and are highly toxic.

Accordingly, primary objects of this invention are to provide novel biocidal compositions which are highly effective and which can be readily incorporated in a wide range of materials and a method of preparing such compositions.

A further object of this invention is to provide non-toxic biocidal compositions.

Additional objects an advantages of the invention will be set forth in part in the description which follows and in part will be obvious from the description or may be learned by practice of the invention. The objects and advantages are realized and attained by means of the compounds, compositions, methods, processes, steps and procedures particularly pointed out in the appended claims.

In accordance with the invention the novel compositions of the invention are prepared by adding organic ether or polyhydric alcohol to a grapefruit derivative prepared by reacting the pulps of fresh grapefruit with an organic alcohol or ketone in the presence of a free radical initiator; then adding at least one substituted dimethyl benzyl ammonium chloride; a monohydric alcohol; and 1-(3-chloroallyl)-3,5,7-triaza - 1 - azoniaadamantane chloride, or 2,4,4'-trichloro-2'-hydroxydiphenyl ether or mixtures thereof to form a final composition.

Each addition is preferably conducted at a temperature of 150 to 170° F., with agitation, and after the addition of the last compound, the agitation is stopped, and the mixture is heated to 190 to 200° F. for about two hours.

The novel compositions of the present invention produced by the above method are biocidal compositions which are effective against a broad spectrum of gram positive and gram negative microorganisms.

It is to be understood that both the foregoing general description and the following detailed description are exemplary and explanatory, but are not restrictive of the invention.

In accordance with the invention, the first step in preparing the novel compositions of the present invention comprises adding at an elevated temperature an organic ether or polyhydric alcohol to a grapefruit derivative prepared by reacting the pulps of fresh grapefruit with an organic alcohol or ketone in the presence of a free radical initiator.

This grapefruit derivative and its method of preparation are fully described in copending U.S. Ser. No. 126,251, entitled "Citrus-Based Chemical Compounds and Processes for Their Production," filed Mar. 17, 1971 and assigned to the same assignee as the present invention. The grapefruit derivative useful in the present invention is the intermediate reaction product described in Serial No. 126,251 and is referred to therein as "CA-90 Base." For a fuller description of the process for preparing the grapefruit derivative, reference is made to that application, and its contents are hereby incorporated by reference.

Briefly, the reaction of the grapefruit pulp with the alcohol or ketone is preferably conducted at a temperature of about 110 to about 140°. The pulp reactant comprises the inner pulp of fresh grapefruit having a low acid content as shown by a pH of about 2.5 to 5. The ratio of alcohol or ketone to grapefruit pulp used in the reaction can be varied widely. Preferably, the weight ratio of grapefruit pulp to alcohol or ketone is about 1:2. The alcohol or ketone is continuously circulated through the pulp for a period of about 12 to 24 hours to produce the derivative, which is a storage stable liquid.

Both monohydric and polyhydric alcohols can be used in preparing the grapefruit derivative useful in this invention. Thus suitable alcohols include methanol, ethanol, isopropanol, n-propanol, n-butanol, allyl alcohol, amyl alcohol, tertamyl alcohol, octyl alcohol, benzyl alcohol, ethylene glycol, propylene glycol, diethylene glycol, dipropylene glycol, triethylene glycol, tetraethylene glycol, glycerine and the like. Acetone is the presently preferred ketone reactant. The polyhydric aliphatic alcohols such as propylene glycol and glycerine are greatly preferred reactants in preparing the grapefruit derivative. The reaction is preferably carried out in the presence of a free radical initiator, most preferably ultraviolet (UV) light. Conventional radical initiators, such as the chemical initiators tertiary butyl hydroperoxide, azobisbutyronitrile, dicumyl peroxide or the like can also be used. UV light has been found to function well in preparing grapefruit derivatives and is presently preferred. UV light may be supplied by commercially available UV light sources or even by sunlight.

For example, the CA-90 Base can be prepared by adding to a laboratory stainless steel reactor one pound (454 gms.) of fresh grapefruit pulp prepared by mechanically removing the outer rind from the inner pulp of grapefruit picked two (2) days previously and two pounds (908 gms.) of propylene glycol USP. The liquid portion of the reaction mixture is circulated through the grapefruit pulp and through Teflon tubing surrounded by an ultraviolet light source for a period of 24 hours. The system is maintained at a temperature of 110° to 120° during this period. A total of 872 gms. of reaction product is then separated from the grapefruit pulp residue by straining through a 16 mesh screen. This product is the CA-90 Base material and is storage stable for an indefinite time.

Suitable organic ethers that can be added to the grapefruit derivative in accordance with the present invention include 2-phenoxyethanol, diethylene glycol butyl ether, dipropylene glycol butyl ether, dipropylene glycol methyl ether, tripropylene glycol methyl ether, diethylene glycol methyl ether, ethylene glycol ethyl ether and n-butyl ether. Suitable polyhydric alcohols that can be added to the grapefruit derivative include propylene glycol, polyethylene glycol, ethylene glycol, triethylene glycol, tetraethylene glycol, tripropylene glycol and dipropylene glycol. Mixtures of polyhydric alcohols, organic ethers, or alcohols and ethers can also be used. For example, a 1:1 weight mixture of ethylene glycol with n-butyl ether can be satisfactorily used in the present invention. Presently, 2-phenoxyethanol is the preferred ether and when mixed with other ethers or alcohols the preferred weight ratio of the 2-phenoxy-ethanol to these other compounds is 1:1.

The mixing of the grapefruit derivative and the organic ethers, polyhydric alcohols or mixtures thereof is generally carried out using a weight ratio of grapefruit derivative to these organic compounds between 95:5 and 5:95 and preferably about P:2. For example, to produce one gallon of the novel biocide of the present invention 908 gms. of 2-phenoxy-ethanol are mixed with 454 gms. of the grapefruit derivative.

The mixing of these two compounds is preferably carried out at a temperature of 150 to 170° F., with agitation, to obtain a clear solution.

A suitable system for carrying out this first stage addition comprises a stainless steel reaction vessel, a cover for the vessel, and a mixer blade powered by a motor mounted on the cover for the vessel.

In accordance with the invention, at least one substituted dimethyl benzyl ammonium chloride is added to the mixture and the mixture is heated. The substituted diethyl benzyl ammonium chloride substituent can be a diisobutylphenoxyethoxyethyl group or a diisobutylcresoxyethoxyethyl group, or an n-alkyl substituent. The n-alkyl substituent preferably comprises a mixture of about 50 percent $C_{14}H_{28}$ groups, about 40 percent $C_{12}H_{25}$ groups, and about 10 percent $C_{16}H_{33}$ groups. Suitable n-alkylated mixtures of alkyl dimethyl benzyl ammonium chloride can be obtained commercially from Rohm and Haas, Philadelphia, Pa. under the trade name "Hyamine 3500" as an 80 percent concentrate in ethyl alcohol, or from Geigy Chemical Corp., Ardsley, N.Y. Diisobutylphenoxyethoxyethyl dimethyl benzyl ammonium chloride is obtained from Rohm and Haas under the trade name "Hyamine 1622" as a solid in powder form and diisobutylcresoxyethoxyethyl dimethyl benzyl ammonium chloride is also obtainable from Rohm and Haas under the trade name "Hyamine 10-X" as a solid in powder form. Mixtures of the various substituted dimethyl benzyl ammonium chlorides can also be employed, preferably in equal weight percentages.

Preferably, to produce one gallon of the novel biocide of this invention, 1250 gms. of substituted dimethyl benzyl ammonium chlorides are added per 908 gms. of organic ether or polyhydric alcohol. The addition of the substituted dimethyl benzyl ammonium chloride is preferably carried out at a temperature of 150 to 170° F., with agitation, for about 5 to 10 minutes, or until a clear solution is obtained.

In accordance with the invention, a monohydric organic alcohol is added to the mixture. Suitable monohydric alcohols for use in the present invention include isopropyl alcohol, ethyl alcohol, denatured methyl alcohol, or mixtures thereof. Preferably between about 686 to 1020 gms. of the alcohol are added to 908 gms. of the polyhydric alcohol or organic ether to produce one gallon of the novel biocide of the present invention.

The addition of the monohydric alcohol preferably is carried out at a temperature of 150 to 170° F., with agitation, for about 5 to 10 minutes, or until a clear solution is obtained.

In an alternate embodiment of the invention, a portion of the monohydric alcohol can be replaced with compositions known as CA-100. These CA-100 compositions and the method of their preparation are fully described in Copending U.S. Ser. No. 138,817, entitled "Biocidal Compositions and Their Method of Preparation, filed on Apr. 29, 1971, and assigned to the same assignee as the present invention. For a fuller description of the process of preparing these CA-100 compositions, reference is made to that application, and its contents are hereby incorporated by reference.

Briefly, the CA-100 compositions are prepared by adding tetrachloroethylene to an organic alcoholic ether such as 2-phenoxyethanol to form a first intermediate mixture and then successively adding (a) 2,3,5,6-tetrachloro-4-(methylsulfonyl)pyridine, (b) salicylanilide, (c) tributyl tin-neodecanoate, (d) 3,4,5-tribromosalicylanilide, and (e) at least one substituted dimethyl benzyl ammonium chloride.

The CA-100 compositions can be substituted for about 1 to 9.8 percent by weight of the monohydric alcohol; and preferably replaces approximately up to 5% by weight of the alcohol. For example, to prepare one gallon of the final biocide composition of the present invention, 100 gms. of the CA-100 composition and 920 gms. of a monohydric alcohol such as isopropyl alcohol are used per 908 gms. of an ether such as 2-phenoxy-ethanol.

In accordance with the invention, 1-(3-chlorallyl)-3,5,7-triaza-1-azoniaadamantane chloride or 2,4,4'-trichloro-2'-hydroxydiphenyl·ether, or mixtures thereof are added to form the final composition of the present invention. The adamantane chloride compound can be obtained commercially under the trade name "Dowicil–100" from Dow Chemical Corporation, as a cream colored powder having a molecular weight of about 251.17. This compound is freely soluble in water up to 25% weight/weight, concentrated solutions are yellow, and it is a known bactericide. The 2,4,4'-trichloro-2'-hydroxydiphenyl ether can be obtained from Geigy Chemical Corp., Ardsley, N.Y. under the trade name "TP 300." Preferably between about 227 to 561 gms. of this last ingredient are added per 908 gms. of polyhydric alcohol or ether.

The addition of 1-(3-chlorallyl)-3,5,7-triaza-1-azoniaadamantane chloride or 2,4,4'-trichloro-2'-hydroxydiphenyl ether is preferably carried out at a temperature of 150 to 170° with agitation, until a clear solution is obtained. After a clear solution is obtained, the agitation is terminated, the temperature is raised to 190 to 210° F., and maintained thereat for about two hours at a pressure of 10–15 p.s.i.g. After two hours, the pressure is released and the temperature is allowed to fall to 90 to 100° F. The final novel composition can then be recovered by filtering the mixture through a filter.

The structure and components of the valuable new compositions of the present invention have not been completely substantiated at this time. Therefore, for purposes of the detailed description herein and in the appended claims, the biocide is characterized by the compounds and steps used in its preparation.

The order of addition and amounts of the compounds used to produce typical compositions of the invention are illustrated in the following formulations, where the compounds are listed in the order that they are mixed:

FORMULATION 1

| | Gms. |
|---|---|
| (1) 2-phenoxy-ethanol | 908–1100 |
| (2) CA-90 Base | 454–500 |
| (3) n-Alkyl (50% $C_{14}H_{28}$, 40% $C_{12}H_{25}$ and 10% $C_{16}H_{33}$) dimethyl benzyl ammonium chloride (Hyamine 3500—Rohm and Haas Co.) | 780–1250 |
| (4) Isopropanol | 686–1020 |
| (5) 1-(3 - chloroallyl) - 3,5,7-triaza-1-azoniaadamantane chloride (Dowicil 100—Dow Chemical Co.) | 227–561 |

FORMULATION 2

| | Gms. |
|---|---|
| (1) 2-phenoxy-ethanol | 908–1100 |
| (2) CA–90 Base | 454–500 |
| (3) Diisobutylphenoxyethoxyethyl dimethyl benzyl ammonium chloride (Hyamine 1622—Rohm and Haas Co.) | 454–650 |
| (4) Isopropanol | 908–1362 |
| (5) Dowicil 100 | 113.5–227 |

FORMULATION 3

| | Gms. |
|---|---|
| (1) Ethylene glycol | 908–1100 |
| (2) CA–90 Base | 454–500 |
| (3) Hyamine 3500 | 780–1250 |
| (4) Isopropanol | 686–1020 |
| (5) Dowicil 100 | 227–561 |

FORMULATION 4

| | Gms. |
|---|---|
| (1) 2-phenoxy-ethanol | 908–1100 |
| (2) CA–90 Base | 454–500 |
| (3) Hyamine 1622 | 454–908 |
| (4) Isopropanol | 908–1362 |
| (5) 2,4,4' - trichloro - 2' - hydroxydiphenyl ether | 113.5–227 |

This invention also contemplates compositions prepared without the use of a polyhydric alcohol or ether as the first ingredient to be added during the formation of the compositions. A typical example of such a formulation is given in Formulation 5 below where the ingredients are listed in their order of addition:

FORMULATION 5

| | Gms. |
|---|---|
| (1) CO–90 Base | 908–1100 |
| (2) Hyamine 1622 | 454–650 |
| (3) Isopropanol | 1362–1816 |
| (4) Dowicil 100 | 100–113.5 |

The novel biocides of the present invention are clear liquids having a deep lemon color, a specific gravity at 60° F. of 1.005 to 1.010, and a pH of 5.5 to 5.7. They are 100% water soluble.

The novel biocides of the present invention have great utility as antimicrobial and antifungal agents, are storage stable, and are nontoxic. They are effective broad-spectrum antimicrobial agents, and are particularly effective against both gram positive and gram negative microorganisms. Exemplary of the microorganisms destroyed or controlled by the compositions of this invention are: *Staphylococcus aureus, Streptococcus lactis, Streptococcus pyogenes, Aspergillus niger, Trichophyton interdigitale, Trichoderma lig., Pullularia pull., Pseudomonas aeruginosa* and *Penicillium ochrochloron.*

The compound can be formulated into a disinfectant composition by forming a solution in water or in the usual organic solvents and plasticizers. The amount of active biocidal agent in such compositions is normally between 3 to 100 p.p.m. and preferably about 10 to 65 p.p.m.

Thus, the present biocidal compositions can be used as a valuable disinfectant in hospitals, schools, offices, homes, and dairy barns, in treating textiles, either during or after their production, carpets, and in the paper and pulp industry as an additive to the pulp in beaters or other processing vessels. Further, the novel biocidal compositions of the invention find application as additives in the laundering of clothing, in the treatment of leather, the purification of swimming pools, and in many other applications. They can be included in sponges to provide a valuable unified product. The compositions can also be used in cleaning solutions to clean and disinfect wall and floor areas, and when so used, they can be incorporated into the solution in an amount up to about 2 percent by weight of the solution.

The following examples are given by way of illustration to further explain the principles of the invention. These examples are merely illustrative and are not to be understood as limiting the scope and underlying principles of the invention in any way. All percentages referred to herein are by weight unless otherwise specifically indicated. For ease of reference the biocidal compositions of this invention are sometimes referred to in the following examples as "CA–100Q."

EXAMPLE 1

This example illustrates the preparation of a biocidal composition of the present invention. To a reaction vessel are added 908 gms. of 2-phenoxy-ethanol and 454 gms. of CA–90 Base. These compounds are heated in the vessel at about 165° F. Agitation is started and 1250 gms. of n-alkyl (50% $C_{14}H_{28}$, 40% $C_{12}H_{25}$, 10% $C_{16}H_{33}$) dimethyl benzyl ammonium chloride are added to the vessel. Thereafter, 825 gms. of anhydrous isopropanol are added to the vessel, followed by an addition of 350 gms. of 1-(3-chloroallyl)-3,5,7-triaza - 1 - azoniaadamantane chloride (Dowicil 100 from Dow Chemical Co.). The temperature is maintained at 165° F., with agitation, until the Dowicil 100 is completely dissolved and a clear solution is obtained. The agitation is then stopped, the temperature is raised to about 200° F., and the pressure is set at 10–15 p.s.i.g. After two hours, the pressure is released and the temperature allowed to fall to about 95° F. A Stainless steel 9–10 micron 120 mesh is used to filter the contents of the vessel and the recovered liquid is the biocidal composition of this invention.

EXAMPLE 2

The general procedure of Example 1 is repeated with the following compounds being added to the vessel in the listed order:

| | Gms. |
|---|---|
| (1) 2-phenoxy-ethanol | 1050 |
| (2) CA–90 Base | 470 |
| (3) Hyamine 1622 | 525 |
| (4) Isopropanol | 1200 |
| (5) Dowicil 100 | 175 |

EXAMPLE 3

The general procedure of Example 2 is repeated with the following compounds being added to the vessel in the listed order:

| | Gms. |
|---|---|
| (1) Ethylene glycol | 975 |
| (2) CA–90 Base | 485 |
| (3) Hyamine 3500 | 850 |
| (4) Isopropanol | 725 |
| (5) Dowicil 100 | 375 |

EXAMPLE 4

The general procedure of Example 2 is repeated with the following compounds being added to the vessel in the listed order:

| | Gms. |
|---|---|
| (1) 2-phenoxy-ethanol | 925 |
| (2) CA–90 Base | 465 |
| (3) Hyamine 1622 | 620 |
| (4) Isopropanol | 1125 |
| (5) 2,4,4'-trichloro-2'-hydroxydiphenyl ether | 125 |

EXAMPLE 5

This example is carried out to determine the antibacterial efficiency of the compositions of this invention when used in laundering clothes. The composition produced in Example 1 is tested in this example against the following organisms:

1. *Staphylococcus aureus* FDA#209;
2. *Trichoderma lig.* 8678;
3. *Trichophyton int.* 9129.

Fifty (50) pounds of clothing garments are placed in a commercial laundry for a normal washing. The garments are thoroughly rinsed to remove all soap and detergent, and to bring the pH of the water in the washer to 7.5 or below. A sample containing one-half (½) fluid ounce of the novel biocidal composition of the present invention (as prepared in Example 1) in one (1) quart of water is then added to the water of the wash cycle. The wash cycle is run for 10 minutes with the water temperature at 90 to 100° F.

The garments are then removed, extracted, and dried in the absence of sunlight. Small samples of 1 cm. x 1 cm. of cloth are cut from the washed garment.

Petri dishes are seeded with 20 mls. of nutrient agar, are inoculated with 0.1 ml. of *Staph. aureus*, and incubated for 48 hours at 37° C. Petri dishes are also seeded with 20 mls. of Sabourauds agar, and are inoculated with 0.2 cc. of the fringe organisms. The small samples of washed and cut garment are placed in the center of the inoculated petri dishes, and incubated at 27–28° C. for 14 days. All tests with each organism is carried out in triplicate. As a control, fifty (50) pounds of garments are washed under normal commercial laundry conditions with enzyme detergents.

After incubation, the clear zone from the edge of the sample garments, is measured in millimeters. The results of these tests are reported in Table 1 below.

TABLE 1.—BACTERIA RESULTS AFTER 48 HRS. FUNGAL RESULTS AFTER 14 DAYS

| Organism | Zone inhibition | |
|---|---|---|
| | ½ fluid ounce of CA-100Q to 50 lbs. garments | Control-normal commercial products |
| *Staph. aureus* | 5½ mm. zone | + + |
| *Trichoderma lig* | 2 mm. zone | + + + |
| *Trichophyton int* | 3 mm. zone | + + + |

NOTE.—Symbol: + +=over growth; + + +=heavy over growth.

It can be seen from these results that usual laundry soap and synthetic detergents of the alkyl-aryl type remove some microorganisms by their mechanical washing action, but the garments support growth of germs and mildew after a short period of time. On the other hand, the compound of the present invention prevents these microorganisms from growing or multiplying. In addition, a number of spore species and microorganisms are killed by the compound of the present invention, and black spotting under high humidity storage condition of garments is eliminated.

The composition is tested according to Federal specification No. CCC-T-1910, and meets the requirements of this specification as a bactericidal and fungicidal agent for laundry use.

EXAMPLE 6

This example is carried out to determine the antibacterial and antifungicidal activity of the compound of the present invention when used in the treatment of leather.

The following test is conducted according to Federal specification No. 5021, KK-L-311A, Leather Methods of Sampling and Testing.

Three different leathers are selected:
(1) synthetic leather;
(2) cow leather;
(3) swine leather.

Samples of each of these leathers are treated with the composition of the present invention as prepared in Example 1 at three different concentrations. As controls, a solution containing a ½ percent concentration of Dowicil 100 and a solution containing one part phenyl mercurial acetate to 250,000 parts water are prepared. A 1 x 1 cm. sample of leather is dipped into the prepared solutions for 10 seconds and allowed to air dry for 21 days.

The treated leather samples are tested against the following organisms:

1. *Aspergillus niger* ATCC
2. *Pullularia pull.* ATCC
3. *Aspergillus orysae* ATCC
4. *Penicillium ochrochloron* 977
5. *Staphylococcus aureus* ATCC 6538
6. *Pseudomonas aeruginosa* ATCC 15442.

Petri dishes are seeded with freshly prepared Sabourauds agar and the fungi cultures are inoculated on the surface of the dishes. Additional petri dishes are seeded with fresh nutrient agar and inoculated with the bacteria test organisms. The treated leather samples are placed into the center of the bacteria inoculated dishes, which are then incubated for 48 hours at a temperature of 28–30° C.

Each test is carried out in triplicate for each test organism and control. After incubation, inhibition zones from the edge of the treated leather samples are measured in millimeters and diameter. The results of these tests are reported in Tables 2 and 3 below.

TABLE 2.—RESULTS OF BACTERIA AFTER 48 HOURS INCUBATION

| Organism | CA-100Q 0.12% | CA-100Q 1:100,000 | CA-100Q 1:250,000 | Dowicil 100 ½% | PMA 1:250,000 |
|---|---|---|---|---|---|
| *Staph. aureus* | 9 mm. zone | 4 mm. zone | 2 mm. zone | Over growth | No zone. |
| *Pseudomonas aeruginosa* | 4 mm. zone | 1 mm. zone | ½ mm. zone | do | Over growth. |

TABLE 3.—RESULTS OF FUNGI AFTER 14 DAYS INCUBATION

| Organism | CA-100Q 0.12% | CA-100Q 1:100,000 | CA-100Q 1:250,000 | Dowicil 100 ½% | PMA 1:250,000 |
|---|---|---|---|---|---|
| *Aspergillus nig* | 4 mm. zone | ½ mm. zone | No over growth | Over growth | No over growth. |
| *Pullularia pull* | 3 mm. zone | 1 mm. zone | do | do | Over growth. |
| *Aspergillus oryz* | 3 mm. zone | 2 mm. zone | do | do | No over growth. |
| *Penicillium ochroch* | 7 mm. zone | do | ½ mm. zone | do | 1 mm. zone. |

The reported results establish that the composition of the present invention as prepared in Example 1 in the three dilutions tested under the Federal specification, is effective against the tested organisms, and meets the Federal Specification as a fungi and bacterial resistant agent.

EXAMPLE 7

This example is carried out to determine the minimum inhibitory concentration of the compositions of this invention.

The novel composition prepared in Example 1 is tested in various dilutions using sterile saline as the diluent. The test of the composition is made after two (2) years of shelf life to determine its effectiveness against gram positive bacteria and gram negative bacteria and storage stability.

All organisms used are subcultured in a tube in an appropriate growth media to insure vigorous growth. Thus, bacteria species are cultured in Trypticase Soy broth, and the yeast and molds are cultured in Sabouraud's Maltose broth.

Final 100-fold dilutions of the compound are made in the growth media. Each tube is inoculated with the viable organism, and incubated at either 37° C. or 25° C. depending upon the specific temperature requirement of the organisms.

The minimum inhibitory concentration is determined as the level that either inhibited the organisms or killed the organisms as evidenced by its failure of growth during the period when the control test developed maximum growth.

The maximum dilution tested was at 1:10,000 or 100 p.p.m. This concentration represents the total concentration of the final composition produced by the procedures described above, and not necessarily the concentration of the active ingredients in that composition. Consequently, all results at 1:10,000 are interpreted as being concentrations equal to or less than 50 to 100 p.p.m.

A total of 70 organisms representing molds, yeasts, acid fast bacteria, gram positive bacteria and gram negative bacteria are tested. The results of these tests are reported in Table 4 below.

TABLE 4

Minimum Inhibitory Concentration of CA–100Q on Various Microorganisms

| Organism: | Minimum Inhibitory Concentration (Dilution) |
|---|---|
| Staphylococcus aureus, Smith | 1:6000 |
| Staphylococcus aureus, FDA #209 | 1:6000 |
| Staphylococcus aureus, USDA 6538 | 1:6000 |
| Staphylococcus aureus, page | 1:6000 |
| Staphylococcus aureus*, MCH #1 | 1:5600 |
| Staphylococcus aureus, MCH #2 | 1:6000 |
| Staphylococcus aureus, MCH #3 | 1:4800 |
| Staphylococcus aureus, MCH #4 | 1:3000 |
| Staphylococcus aureus, MCH #5 | 1:4000 |
| Staphylococcus aureus, MCH #6 | 1:6000 |
| Staphylococcus aureus, MCH #7 | 1:7000 |
| Staphylococcus aureus, MCH #8 | 1:10,000 |
| Staphylococcus aureus, MCH #9 | 1:6000 |
| Streptococcus tecalis | 1:1800 |
| Alpha - Hemolytic streptococcus, MCH #9 | 1:6000 |
| Alpha - Hemolytic streptococcus, MCH #10 | 1:4800 |
| Alpha - Hemolytic streptococcus, MCH #11 | 1:7000 |
| Alpha - Hemolytic streptococcus, MCH #12 | 1:4800 |
| Alpha - Hemolytic streptococcus, MCH #13 | 1:6000 |
| Alpha - Hemolytic streptococcus, MCH #16 | 1:2800 |
| Alpha - Hemolytic streptococcus, MCH #15 | 1:6000 |
| Beta - hemolytic streptococcus, MCH #16 | 1:1800 |
| Beta - hemolytic streptococcus, MCH #15 | 1:10,000 |
| Diplococcus pneumoniae | 1:10,000 |
| Diplococcus pneumoniae, MCH #17 | 1:1800 |
| Erwinia carotovova, ATCC 8061 | 1:4800 |
| Bacillus subtilis, ATCC 6633 | 1:3600 |
| Corynebacterium equi | 1:10,000 |
| Listeria monocytogenes | 1:4800 |
| Clostridium sporogenes, ATCC 319 | 1:4800 |
| Mycobacterium Ovium | 1:10,000 |
| Mycobacterium smegmatis | 1:10,000 |
| Mycobacterium phlei | 1:10,000 |
| Candida albicans | 1:6000 |
| Candida mycoderma | 1:4800 |
| Saccharomyces cerevisiae var. ellips. | 1:10,000 |
| Escherichia coli, strain B, ATCC 11303 | 1:1800 |
| Escherichia coli, ATCC 9637 | 1:1200 |
| Escherichia coli, MCH #18 | 1:1200 |
| Escherichia coli, MCH #19 | 1:800 |
| Escherichia coli, MCH #20 | 1:800 |
| Escherichia coli, MCH #21 | 1:800 |
| Escherichia coli, MCH #22 | 1:1000 |
| Escherichia coli, MCH #23 | 1:400 |
| Escherichia coli, MCH #24 | 1:400 |
| Klebsiella pneumoniae, CCH | 1:400 |
| Klebsiella pneumoniae, MCH #25 | 1:200 |
| Klebsiella pneumoniae, MCH #26 | 1:200 |
| Klebsiella pneumoniae, MCH #27 | 1:400 |
| Klebsiella pneumoniae, MCH #28 | 1:200 |
| Klebsiella pneumoniae, MCH #29 | 1:100 |
| Proteus vulgaris, Upjohn | 1:100 |
| Proteus vulgaris, MCH #30 | 1:100 |
| Proteus vulgaris, MCH #31 | 1:100 |
| Pseudomonas aeruginosa, ATCC 10145 | 1:100 |
| Pseudomonas aeruginosa, MCH #32 | 1:100 |
| Salmonella typhimurium | 1:400 |
| Salmonella schottmuelleri | 1:400 |
| Salmonella pullorum | 1:800 |
| Shigella flexneri | 1:600 |
| Aspergillus niger | 1:2600 |
| Aspergillus tamarii | 1:3600 |
| Aspergillus oryzae | 1:3800 |
| Aspergillus sulf. | 1:3600 |
| Pullularia pullulans | 1:2500 |
| Chaetomium globosum | 1:600 |
| Cladosporium resinae | 1:4800 |
| Epidermopjyton floccosum | 1:1000 |
| Fusarium moniliforme | 1:10,000 |
| Memnoniella echinata | 1:4800 |
| Microsporum gypsum | 1:3600 |
| Penicillium citrinum | 1:3600 |
| Penicillium italicum | 1:4800 |
| Penicillium fon. | 1:2400 |
| Poria monticola | 1:10,000 |
| Trichophyton tonsurans | 1:10,000 |
| Trichophyton mentagrophytes | 1:10,000 |
| Trichophyton inter. | 1:10,000 |

*MCH strain cultures are clinical isolates used to represent effectiveness of CA–100Q against non-culture collection organisms.

EXAMPLE 8

This example is carried out to determine the bacteriostatic and bactericidal of the novel compositions of the present invention. The procedures used in this example for the maintenance of cultures, growth media inoculation, etc., are those specified in A.O.A.C. method 5.001–5.005 and 5.01–5.022, and the methods for the bacteriostatic and bactericidal tests are those described in *Disinfection and Sterilization*, 1st Ed., George Sykes. The composition produced in Example 1 is tested in this example in each of the following dilutions: (1) 1:100; (2) 1:200; (3) 1:400; (4) 1:1,000; (5) 1:10,000; (6) 1:25,000. All dilutions are made with distilled water containing 5% Tween 80. The composition of this invention is tested against the following organisms:

1. Staphylococcus aureus (FDA No. 209)
2. Streptococcus pyogones ATCC 9342.

Surface inhibition and surface contact lethal tests are conducted with these organisms.

In the surface inhibition, the test dilutions of CA–100Q are spread on the surface of Brain Heart Infusion agar plates and allowed to dry. Then the plates are 0.2 ml. of test cultures previously grown on Trypticase soy broth are placed in shake cultures of 200 ml. for 48 hours and examined for growth. A control is run parallel with distilled water containing 0.5% Tween 80. Results of the surface inhibition test are reported below in Table 5.

TABLE 5.—RESULTS OF SURFACE INHIBITION

| Dilution of test material CA-100Q | Staphylococcus aureus | Streptococcus pyogenes | Control |
|---|---|---|---|
| 1:100 | − | − | + |
| 1:200 | − | − | + |
| 1:400 | − | − | + |
| 1:10,000 | − | − | + |
| 1:25,000 | − | − | + |

NOTE.—Symbols: −=no growth, +=growth.

In the surface contact lethal test, Brain Heart Infusion is poured over cultures of the test organisms on agar plates. Each test dilution is inoculated thickly over the surface of 24-hour old cultures of the test organism, and the cultures are then incubated. The cultures are then exposed to the test dilutions at intervals. Disks are taken out with a sterile cork borer and transferred to tubes of Trypticase soy broth. The disks are then exposed to the test dilutions for the following intervals: 15 sec., 30 sec., 60 sec., 2 min., 3 min., 5 min., and 10 min. After 48 hours the broth is carefully examined for growth. Results of these tests are reported in Table 6 below.

TABLE 6

Surface lethal test for *Staphylococcus aureus* and *Streptococcus pyogenes*

| Dilution | Time (minutes) | | | | | | | |
|---|---|---|---|---|---|---|---|---|
| | .25 | .5 | 1 | 2 | 3 | 4 | 5 | 10 |
| 1:100 | − | − | − | − | − | − | − | − |
| 1:200 | − | − | − | − | − | − | − | − |
| 1:400 | − | − | − | − | − | − | − | − |
| 1:1,000 | − | − | − | − | − | − | − | − |
| 1:10,000 | − | − | − | − | − | − | − | − |
| 1:25,000 | + | + | − | − | − | − | − | − |
| Control | + | + | ++ | ++ | +++ | +++ | +++ | +++ |

NOTE.—Symbols: −=no growth; +=slight growth; ++=over growth; +++=heavy growth.

These tests show that the compositions of this invention are active surface growth inhibitors against the test organisms in all dilutions tested. On the surface lethal test, the compositions are effective against *Staphylococcus aureus* 209, in killing the organism in a period of 30 seconds. *Streptococcus pyogenes* 9342 is inactivated in 15 seconds.

The invention in its broader aspects is not limited to the specific details shown and described and departures may be made from such details without departing from the principles of the invention and without sacrificing its chief advantages.

What is claimed is:

1. A process for preparing an antibacterial and antifungal composition comprising the steps of:
   (a) Adding an organic ether, polyhydric alcohol or mixtures thereof to a grapefruit derivative prepared by reacting the pulps of fresh grapefruit with an organic alcohol or acetone in the presence of a free radical initiator selected from the group consisting of tertiary butyl hydroperoxide, azobisbutyronitrile, and dicumyl peroxide, and heating at a temperature of 150° to 170° F. to form a mixture, the weight ratio of grapefruit derivative to said organic ether, polyhydric alcohol or mixtures thereof being between 95:5 and 5:95;
   (b) Adding, based on 908 to 1100 grams of the organic ether, polyhydric alcohol or mixtures thereof, 686 to 1020 grams of a monohydric alcohol and 780 to 1250 grams of at least one substituted dimethyl benzyl ammonium chloride to the mixture and heating at a temperature of 150° to 170° F.;
   (c) Adding 227 to 561 grams of 1-(3-chloroallyl)-3,5,7-triaza-1-azoniaadamantane chloride or 2,4,4′-trichloro-2′-hydroxydiphenyl ether, or mixtures thereof per 908 to 1100 grams of the organic ether, or polyhydric alcohol, and heating at a temperature of 150° to 170° F. until a clear solution is obtained.

2. The process of claim 1 wherein the organic ether of step (a) is 2-phenoxy-ethanol, diethylene glycol butyl ether, dipropylene glycol butyl ether, dipropylene glycol methyl ether, tripropylene glycol methyl ether, diethylene glycol methyl ether, ethylene glycol ethyl ether, n-butyl ether, or mixtures thereof, and the polyhydric alcohol is propylene glycol, polyethylene glycol, ethylene glycol, triethylene glycol, tetraethylene glycol, tripropylene glycol, dipropylene glycol, or mixtures thereof.

3. The process of claim 1 wherein the substituted dimethyl benzyl ammonium chloride substituent is diisobutylphenoxyethoxyethyl, diisobutylcresoxyethoxyethyl or n-alkyl, said n-alkyl substituent being a mixture of about 50% $C_{12}H_{25}$, 40% $C_{16}H_{33}$, and about 10% $C_{14}H_{29}$.

4. The process of claim 1 wherein the monohydric alcohol of step (b) is isopropanol, ethyl alcohol, methyl alcohol or mixtures thereof.

5. A method for controlling and destroying fungi and bacteria which comprises applying to an area contaminated with such fungi and bacteria a fungicidally and bactericidally effective amount of the product prepared by the process of claim 1.

6. A process for preparing an antibacterial and antifungal composition comprising:
   (a) Adding a monohydric alcohol to a grapefruit derivative prepared by reacting pulps of fresh grapefruit with an organic alcohol or acetone in the presence of a free radical initiator selected from the group consisting of tertiary butyl hydroperoxide, azobisbutyronitrile and dicumyl peroxide, and heating at a temperature of 150° to 170° F. to form a mixture, the amount of monohydric alcohol being between 1362 and 1816 grams per 908 to 1100 grams of grapefruit derivative;
   (b) Adding, based on 908–1100 grams of the grapefruit derivative, 454 to 650 grams of at least one substituted dimethyl benzyl ammonium chloride to the mixture and heating at a temperature of 150° to 170° F.; and
   (c) Adding, based on 908–1100 grams of the grapefruit derivative, 100 to 113.5 grams of 1-(3-chloroallyl) - 3,5,7-triaza-1-azoniaadamantane chloride or 2,4,4′-trichloro-2′-hydroxydiphenyl ether or mixtures thereof and heating at a temperature of 150° to 170° F. until a clear solution is obtained.

7. A process for preparing an antifungal and antibacterial composition comprising:
   (a) Adding an organic ether, polyhydric alcohol or mixtures thereof to a grapefruit derivative prepared by reacting the pulps of fresh grapefruit with an organic alcohol or acetone in the presence of a ultraviolet light, and heating at a temperature of 150° to 170° F. to form a mixture, the weight ratio of grapefruit derivative to said organic ether, polyhydric alcohol, or mixtures thereof being between 95:5 and 5:95;
   (b) Adding, based on 908 to 1100 grams of the organic ether, polyhydric alcohol or mixtures thereof, 686 to 1020 grams of a monohydric alcohol and 780 to 1250 grams of at least one substituted dimethyl benzyl ammonium chloride to the mixture and heating at a temperature of 150° to 170° F.;
   (c) Adding 227 to 561 grams of 1-(3-chloroallyl)-3,5,7-triaza - 1 - azoniaadamantane chloride, 2,4,4′-trichloro-2'-hydroxydiphenyl ether, or mixtures thereof per 908 to 1100 grams of the organic ether or polyhydric alcohol, and heating at a temperature of 150° to 170° F. until a clear solution is obtained.

8. The process according to claim 7 wherein the mixing of the grapefruit derivative with the organic ether, polyhydric alcohol, or mixtures thereof is carried out using a weight ratio of grapefruit derivative to said organic ether, polyhydric alcohol or mixtures thereof of about 1:2.

9. The process according to claim 8 wherein about 1250 grams of substituted dimethylbenzylammonium chloride is added per 908 grams of organic ether, polyhydric alcohol, or mixtures thereof, and between about 686 to 1020 grams of monohydric organic alcohol are added per 908 grams of the polyhydric alcohol, organic ether or mixtures thereof.

10. The process according to claim 9 wherein 227 to 561 grams of 1-(3-chloroallyl)-3,5,7-triaza-1-azoniaadamantane chloride, 2,4,4'-trichloro - 2' - hydroxydiphenyl ether, or mixtures thereof are added per 908 grams of the polyhydric alcohol, or organic ether.

11. A method for controlling and destroying fungi and bacteria which comprises applying to an area contaminated with such fungi and bacteria a fungicidally and bactericidally effective amount of the product prepared by the process of claim 7.

12. A process for preparing an antifungal and antibacterial composition comprising:
(a) Adding a monohydric alcohol to a grapefruit derivative prepared by reacting pulps of fresh grapefruit with an organic alcohol or acetone and heating at a temperature of 150° to 170° F. to form a mixture, the amount of monohydric alcohol being between 1362 to 1816 grams per 908 to 1100 grams of grapefruit derivative;
(b) Adding, based on 908–1100 grams of the grapefruit derivative, 454 to 650 grams of at least one substituted dimethyl benzyl ammonium chloride to the mixture and heating at a temperature of 150° to 170° F.; and
(c) Adding, based on 908–1100 grams of the grapefruit derivative, 100 to 113.5 grams of 1-(3-chloroallyl)-3,5,7-triaza-1-azoniaadamantane chloride, 2,4,4'-trichloro - 2' - hydroxydiphenyl ether or mixtures thereof and heating at a temperature of 150° to 170° F. until a clear solution is obtained.

References Cited

Chemical Abstracts, Vol. 48 (1964), p. 4148d.

VINCENT D. TURNER, Primary Examiner

U.S. Cl. X.R.

424—244, 329, 341; 252—106, 107